United States Patent

Beyda et al.

[11] Patent Number: 5,995,607
[45] Date of Patent: Nov. 30, 1999

[54] ENHANCED TELEPHONY TRUNK ROUTING

[75] Inventors: William Joseph Beyda, Cupertino; Shmuel Shaffer, Palo Alto, both of Calif.

[73] Assignee: Siemens Information and Communication Networks, Inc., Boca Raton, Fla.

[21] Appl. No.: 09/172,785

[22] Filed: Oct. 14, 1998

[51] Int. Cl.[6] .............................. H04M 3/42; H04M 7/00; H04L 12/66
[52] U.S. Cl. .......................... 379/202; 379/221; 379/420; 370/352; 370/260
[58] Field of Search ..................................... 379/219, 221, 379/202, 420; 370/352, 353, 354, 355, 356, 252, 260

[56] References Cited

U.S. PATENT DOCUMENTS

| | | | |
|---|---|---|---|
| 5,483,582 | 1/1996 | Pugh et al. .............................. | 379/144 |
| 5,828,666 | 10/1998 | Focsaneanu et al. .................... | 370/389 |
| 5,838,665 | 11/1998 | Kahn et al. .............................. | 370/260 |

*Primary Examiner*—Scott Wolinsky
*Assistant Examiner*—David Huynh

[57] ABSTRACT

An apparatus and a method for enhancing telephony trunk routing includes a call requirements assessor which identifies call requirements associated with a call request. In particular, the call requirements assessor recognizes call requests which are indicative of speaker-phone calls and conference calls. A comparison processor responds to call data received from the call requirements assessor bad comparing the call requirements of a particular call with the quality of service capabilities of an Internet telephony trunk and a non-Internet telephony trunk. A call request which includes a request for a speaker-phone call or a conference call triggers the comparison processor to instruct a call router to route a call via the non-Internet telephony trunk. If a request to activate a conference-call feature or a speaker-phone feature is received from a telephone after an Internet telephony trunk connection has been established, a notification is transmitted to the telephone indicating that the Internet telephony call is incompatible with the activation request. In a preferred embodiment, the request for a conference call is rejected if it is made during an Internet telephony call. In an alternative embodiment, an in-session switch is performed from the Internet telephony trunk to a non-Internet telephony trunk connection in response to an attempted activation of the conference-call feature or the speaker-phone feature during an Internet telephony trunk connection.

15 Claims, 4 Drawing Sheets

ENHANCED TELEPHONY TRUNK ROUTING

BACKGROUND OF THE INVENTION

The invention relates generally to a telecommunications method and apparatus and, more specifically, to a system and apparatus for selectively routing outbound telephone calls.

DESCRIPTION OF THE RELATED ART

Conventional long distance telephone service carriers bill for long distance service at a rate based at least partially on the distance between the calling party and the called party. A long distance call is first directed from the customer's premises to a first long distance carrier toll office via a central office of a local exchange carrier (LEC). The first toll office is connected to numerous toll offices, each of which provides the first toll office access to a different local access and transport area (LATA). Voice information of a long distance call is carried from the first long distance toll office to a second long distance toll office which delivers the voice information to a local central office within the called party's LATA. The local central office delivers the voice information to the premises of the called party.

Not surprisingly, the majority of the cost for a long distance call can usually be attributed to the expense of establishing the connection between the first and the second toll offices. With some exceptions, the cost of establishing the connection between two toll offices increases as the distance between the toll offices increases. Consequently, a call from New York to Boston is usually less expensive than a call from New York to Los Angeles. Long distance rates will often fluctuate, depending on what time of the day and which day of the week the call is made. Long distance calls placed during the day are usually more expensive than nighttime calls, and weekend calls are less expensive than weekday calls. A long distance customer of a long distance service which utilizes such a billing scheme must take into account the distance of a long distance call as well as the time at which the call is made in order to ensure that the lowest rate for a call is received. For example, the customer under the above-described billing scheme is required to schedule calls for evening in order to save money. However, the urgency of a call or such practical considerations as the business hours of a called party often prevent the customer from benefitting under the reduced evening rates of the above-described billing scheme.

A local exchange carrier conventionally charges for local phone service according to a monthly flat fee. The flat fee permits a customer to make unlimited local phone calls. With the convergence of voice and data networks, a viable alternative to conventional long distance service has developed. For example, Internet telephony technology enables a caller to transmit voice information over the global data network commonly known as the Internet. In a business environment, a private branch exchange (PBX) can be equipped with an Internet trunk which provides a connection to an Internet service provider. Utilizing the Internet telephony trunk, a caller can place a long distance call in which the only charge incurred is a charge for use of the Internet service provider. Typically, an Internet service provider charges on a per connection basis or a flat fee basis. The cost to the customer of making a long distance call utilizing the Internet telephony trunk will generally be significantly less than if the customer places the same long distance call through a conventional long distance carrier. Furthermore, the cost of the Internet telephony long distance calls are fixed, so that the cost call does not increase in relation to the duration of the call.

The quality of service provided by an Internet telephony call is inferior to the quality of service associated with conventional long distance carriers. For certain types of calls, the quality of service provided by Internet telephony is not acceptable. If a PBX is configured to automatically route particular calls over an Internet telephony trunk, the potential exists that a call with higher quality of service requirements than those provided by an Internet telephony trunk will be routed over the Internet telephony trunk.

What is needed is a selective routing method which avoids establishing Internet telephony connections if an Internet telephony connection does not satisfy the quality of service requirements for a particular call.

SUMMARY OF THE INVENTION

An apparatus and a method for enhancing telephony trunk routing include a call requirements assessor which determines quality of service requirements for outgoing calls, a comparison processor which compares call requirements to quality of service capabilities of multiple trunks (including a voice-over-data-network trunk) and a call router which selects a non-voice-over-data-network trunk in response to a determination that the call requirements for a particular call exceed the capabilities of the voice-over-data-network trunk. In a preferred embodiment, the invention is practiced in a PBX and the voice-over-data-network trunk is an Internet telephony trunk. Alternatively, the invention can be embodied within a central office of a public switch telephone network (PSTN).

The call requirements assessor determines whether a call request includes a request to establish a conference call or a speaker-phone call. The call requirements assessor is configured to detect a protocol element which is transmitted from a telephone upon activation of a speaker phone feature and/or a conference-call feature of a telephonic device. The inherent characteristics of a speaker-phone call introduce more ambient noise into a call connection than a call in which the caller utilizes a telephone handset. Although an Internet telephony call provides a sufficient quality of service for a handset call, the additional ambient noise introduced in a speaker-phone call degrades the voice transmission quality to an unacceptable extent. Regarding the detection of a conference call, a conference call requires that transmission delays are maintained below approximately 100 milliseconds in order to avoid excessive echo. Depending on the traffic on the Internet, delays above the 100 millisecond range are not uncommon. As additional or alternative criteria, the call requirements processor determines the requirements for a particular call in part based on class of service data included in the call request. For example, the call request may indicate that the call is being initiated from a telephone of a company CEO who has a permanently assigned class of service which does not permit routing of calls over the Internet telephony trunk.

The call requirements assessor provides call data to the comparison processor. The comparison processor directs a call router to route the call over a non-Internet telephony trunk, if the call data is indicative of a speaker-phone call or a conference call. In one implementation, after the call has been routed over an Internet telephony trunk, upon detecting an attempt to activate either the speaker-phone feature or the conference-call feature, an alerting device provides notification to the telephone from which the call originated that the call is incompatible with the speaker-phone feature or the conference-call feature. In another embodiment, the alerting device prevents activation of the conference-call feature upon an attempted activation of the conference-call feature. In an alternative embodiment, the call router is configured to perform an in-session switch from the Internet telephony trunk to the non-Internet telephony trunk in response to an attempted activation of either the speak-phone feature or the conference-call feature during an Internet telephony trunk connection.

DETAILED DESCRIPTION

Figure 1:
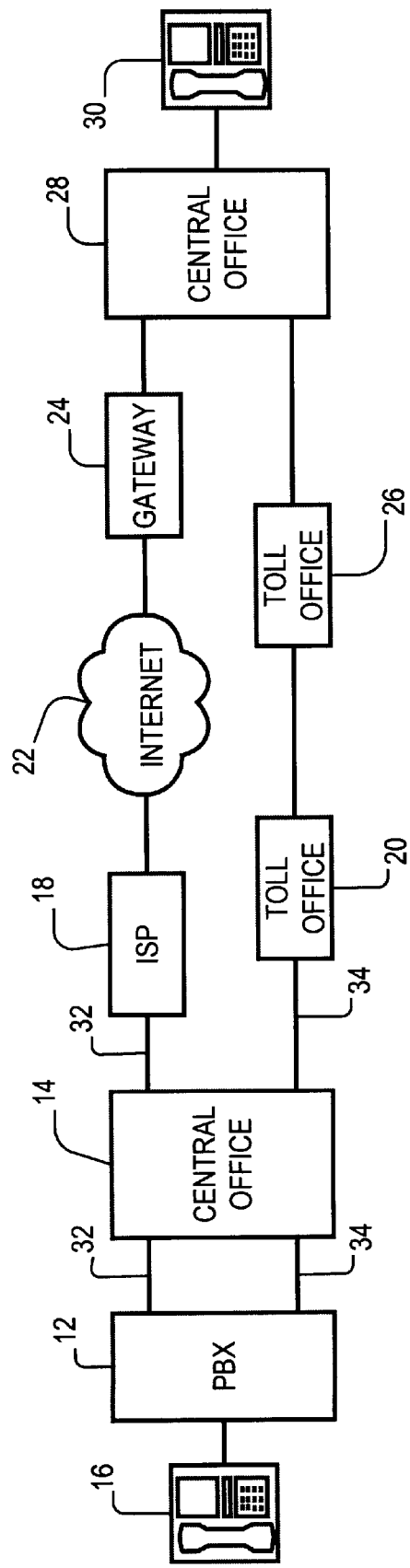
FIG. 1 is a block diagram of the operating environment of the enhanced telephony trunk router of the present invention.
Figure 2:
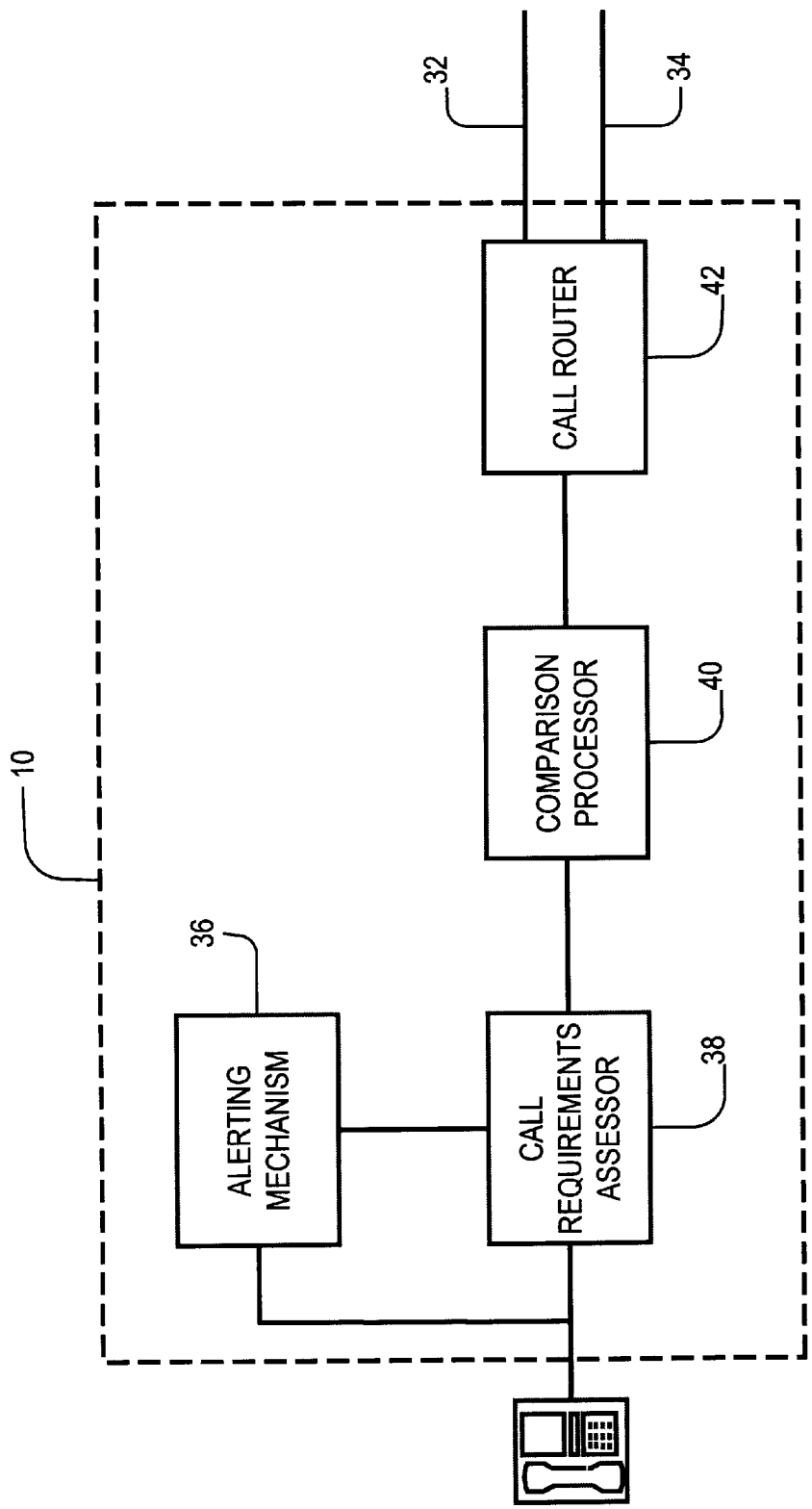
FIG. 2 is a block diagram of the functional components of the enhanced telephony trunk router shown in FIG. 1.

With reference to FIGS. 1 and 2, in a first embodiment, an enhanced telephony router 10 is located in a PBX 12. The PBX 12 provides telephony to a first telephone 16, which has a speaker-phone capability and a conference call capability. The speaker-phone feature is locally provided on the first telephone 16, while the conference-call feature is provided to the first telephone by the PBX 12. The first telephone 16 is configured to notify the PBX 12 upon activation of the speaker-phone feature, either during call setup or after a call is established. The PBX 12 has an Internet telephony trunk 32 which connects the PBX to an Internet service provider (ISP) 18 via a first central office 14 of a PSTN. Because the precise connection to the ISP 18 is not critical to the invention, the PBX can be connected directly to the ISP rather than through the central office. A second trunk 34 connects the PBX 12 to a first toll office 20 of a long distance carrier via the first central office 14.

The first toll office 20 and the ISP 18 provide the PBX with two independent long distance connection options from which the PBX can select, depending on the call requirements of a call request generated by the first telephone 16. A first option utilizes Internet telephony and is routed through the Internet 22 via the ISP 18. A gateway 24 provides protocol conversion functions to enable communication with a second telephone 30 via a second central office 28. Alternatively, the second telephone might be located on a data network connected to the Internet so that the connection to the second telephone 30 is routed directly to the second telephone via a router (not shown), instead of through the gateway 24 and the second central office 28. A second long distance connection option utilizes a connection via the first long distance carrier toll office 20 and a second toll office 26 to the second central office. The connection between the first and second toll offices might include a satellite transmission and/or a fiber-optic connection.

With continued reference to FIGS. 1 and 2, the functional components of the enhanced telephony trunk router can be located within the PBX 12 or within the first central office 14. A call requirements assessor 38 monitors a call request to determine the quality of service requirements for a particular call. In a preferred embodiment, the call requirements assessor 38 is configured to detect an attempt to activate the speaker-phone feature on the first telephone 16 or an attempt to activate the conference-call feature provided either by the PBX 12 or the first central office 14. If the call request indicates an activation of either or both of the speaker-phone feature and/or the conference-call feature (e.g., a conference call made on the speaker-phone), the call requirements assessor 38 passes the call request data to a comparison processor 40. Upon activation of the speaker-phone feature, for instance by a user depressing a speaker-phone key on first telephone 16, the first telephone transmits a speaker-phone protocol element to the call requirements assessor. Similarly, first telephone 16 transmits a conference call protocol element to the call requirements assessor when a user activates the conference-call feature.

The comparison processor 40 is configured to access quality of service capability data associated with the Internet telephony trunk 32 and the non-Internet telephony trunk 34 in response to a call request. The quality of service capability data for the Internet telephony trunk indicates that the Internet telephony trunk is not compatible with speaker-phone calls and conference calls, whereas the quality of service data for the non-Internet telephony trunk 34 indicates that the non-Internet telephony trunk is compatible with both speaker-phone and conference calls. The comparison processor 40 selects the non-Internet telephony trunk in response to call data received from the call requirements assessor 38, which indicates that the call request includes either a conference call request, a speaker-phone call request, or both. Though it is not critical to the invention, if the call request includes neither a conference call request nor a speaker-phone call request, the comparison processor 40 selects the Internet telephony trunk when the call requirements assessor 38 indicates that the call request is for a long distance call.

In an alternative embodiment, the comparison processor 40 is also configured to perform the trunk selection based on call service class data associated with call requests. For example, within a corporation, different employees and managers are assigned different call service classes. A first call service class, which might be reserved for individuals who routinely make higher priority phone calls, such as the CEO, requires that all calls under the first call service class be routed over the non-Internet telephony trunk 34, regardless of the call requirements for any particular call. A second call service class requires that the selection of a trunk for calls made under the second call service class be made based on the call requirements of each particular call.

Upon selecting either the Internet telephony trunk 32 or the non-Internet telephony trunk 34, the comparison processor 40 communicates the selection to a call router 42 which routes the call over the selected telephony trunk. In this manner, speaker-phone calls and conference calls, which require a quality of service level which the Internet telephony trunk cannot dependably provide, are routed over the non-Internet telephony trunk.

A user might initially place a long distance call request which includes neither a conference call request nor a speaker-phone call request. Call requirements assessor 38, comparison processor 40, and call router 42 cooperate to select the Internet telephony trunk 32 to establish a long distance call. After the call is established, the user might attempt to activate the speaker-phone feature or the conference-call feature from the first telephone 16. The enhanced telephony trunk router can respond in one of several ways. In a first embodiment, the router simply allows activation of the speaker-phone feature and/or the conference-call feature.

In a second embodiment, the call requirements assessor is adapted to notify an alerting mechanism 36 in response to the attempted activation during an Internet telephony call. The alerting mechanism alerts the first telephone 16 that the selected Internet telephony trunk is incompatible with activation of the speaker-phone function or the conference call function. The notification can be in the form of a text message displayed on an LCD display (not shown) of the first telephone 16. Alternatively, the notification might be in the form of a voice message which is transmitted from the alerting mechanism 36. The notification preferably provides the user with the option to override the notification by activating the desired call feature in spite of the notification. As another alternative in this second embodiment, the alerting mechanism 36 is configured to prevent activation of the conference-call feature during an Internet telephony call. Because the speaker-phone feature is locally controlled by first telephone 16, the alerting mechanism is not able to prevent activation of the speaker-phone feature. The alerting mechanism can be configured to provide notification of the incompatibility of speaker-phone activation and conference call activation during an Internet telephony call in addition to preventing activation of the conference-call feature during the Internet telephony call.

In a third embodiment, the enhanced telephony trunk router 10 responds to an attempt to activate either the speaker-phone feature or the conference-call feature during an Internet telephony call by performing an insession switch from the Internet telephony trunk to the non-Internet telephony trunk. Preferably, the in-session switching feature is performed only in response to an attempt to activate the conference-call feature during an Internet telephony call, but not in response to an attempt to activate the speaker-phone feature, because the in-session switching is a costly function.

The call requirements assessor 38 recognizes an attempt to activate the conference-call feature during an Internet telephony call and responds by communicating the attempted activation to the comparison processor 40. The comparison processor 40 accesses the quality of service capability data associated with the Internet telephony trunk 32 and the non-Internet telephony trunk 34 and determines that the Internet telephony trunk is not compatible with the attempted activation of the conference-call feature. An in-session switching signal is then transmitted from the comparison processor 40 to the call router 42. The call router determines whether the second telephone is capable of establishing a non-Internet telephony connection. Upon determining that the second telephone is capable of such a connection, the call router 42 establishes a non-Internet telephony trunk connection to the second central office 28 via the first toll office 20 and the second toll office 26. The call router 42 tears down the Internet telephony connection to the second telephone 30 and switches the call to the nonInternet telephony trunk connection.

Figure 3:
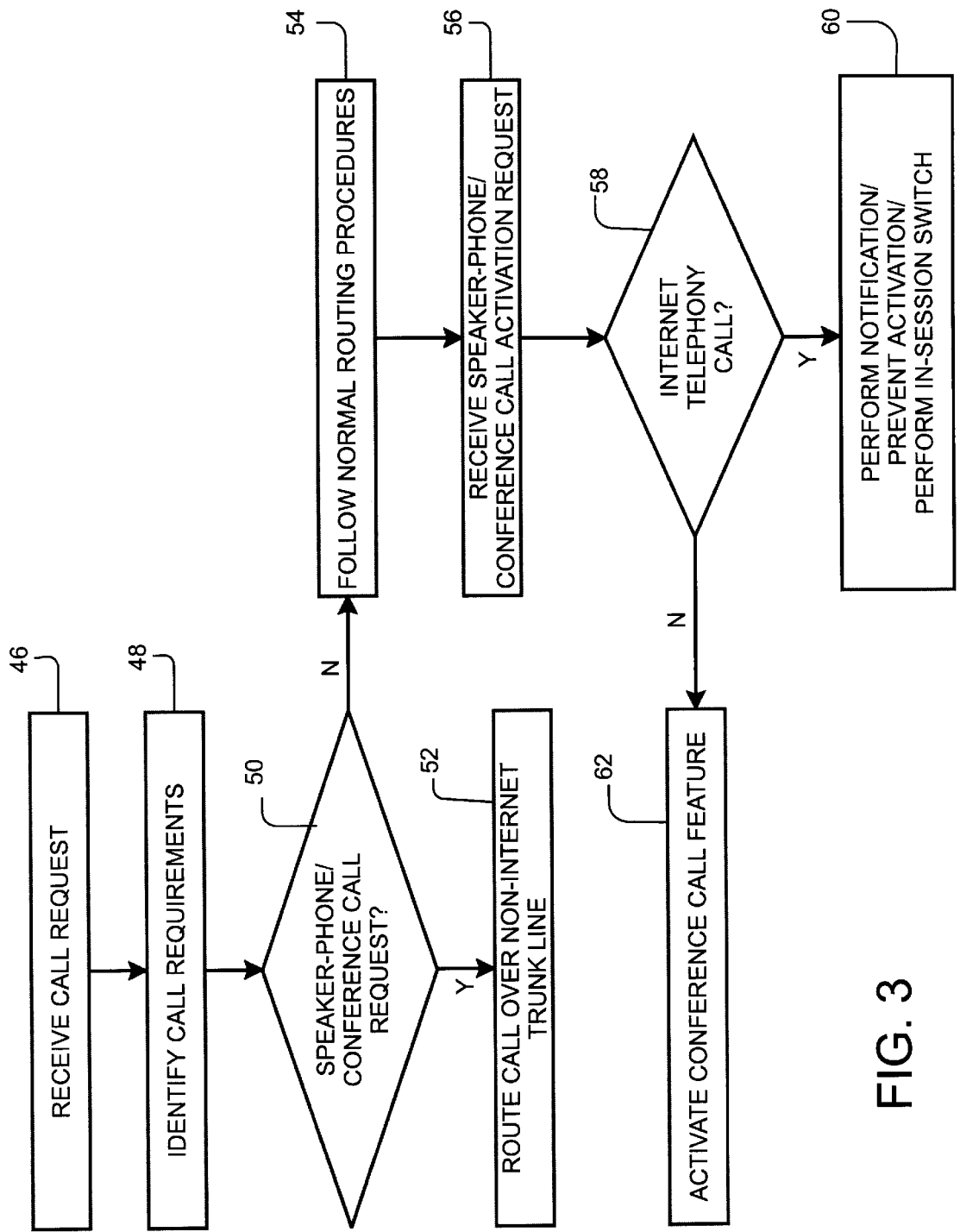
FIG. 3 is a process flow for the enhanced telephony trunk routing method employed by the enhanced telephony trunk router shown in FIG. 2.

Referring to FIGS. 1, 2 and 3, an enhanced telephony trunk routing method includes the step 46 of receiving a call request which includes call requirement data. In step 48, the call requirements assessor 38 identifies the requirements of the request by determining whether the request includes a request to establish a conference call or a speaker-phone call in step 50. In an alternative embodiment, the step of identifying call requirements for call requests includes determining a call service class associated with the call request. If the call request is associated with a first call service class, the call will be routed over the non-Internet telephony trunk regardless of whether the call request is for a speaker-phone call and/or a conference phone call. If the call request is associated with a second call service class, the selection of a trunk for the call will be determined by whether the call request includes a request to establish a speaker-phone call or a conference phone call.

In step 52, upon receiving call data from the call requirements processor indicating that the call request includes a request to establish either a conference call or a speaker-phone call, the comparison processor 40 ascertains that the call request is not compatible with routing the call over the Internet telephony trunk and instructs the call router 42 to route the call over the non-Internet telephony trunk. In selectively routing call requests for speaker-phone calls and conference calls over the non-Internet telephony trunk, the present method assures that the speaker-phone calls and the conference calls will receive a minimum required quality of service.

If the comparison processor determines that the call request does not include a request to make a speaker-phone call or a conference phone call, in step 54 the comparison processor 40 instructs the call router 42 to route the call over the Internet telephony trunk 32 if the call request is for a long distance phone call. If the call request is for a local call, the comparison processor directs the call router to route the call over the non-lnternet telephony trunk. In step 56, a request to activate the speaker-phone feature and/or the conference-call feature in first telephone 16 is received. In step 58 the comparison processor determines whether the present call is an Internet telephony call or a non-Internet telephony call. Upon determining that the call is a non-Internet telephony call, the conference-call feature is activated for first telephone 16 in step 62.

In step 60, a determination has been made that the call is an Internet telephony call and, in response, the alerting mechanism 36 notifies first telephone 16 that the present Internet telephony call is not compatible with activation of the speaker-phone feature or the conference-call feature. The notification can be in the form of a text message which is displayed on a display on the first telephone 16, such as an LCD. Alternatively, the notification can be in the form of a voice message which is transmitted to first telephone 16. The text message is preferred because conversation over the call may interfere with the caller receiving and understanding the voice message. If the request for a conference call is received during the Internet telephony call, the call router 42 can prevent the conference call from being established.

Figure 4:
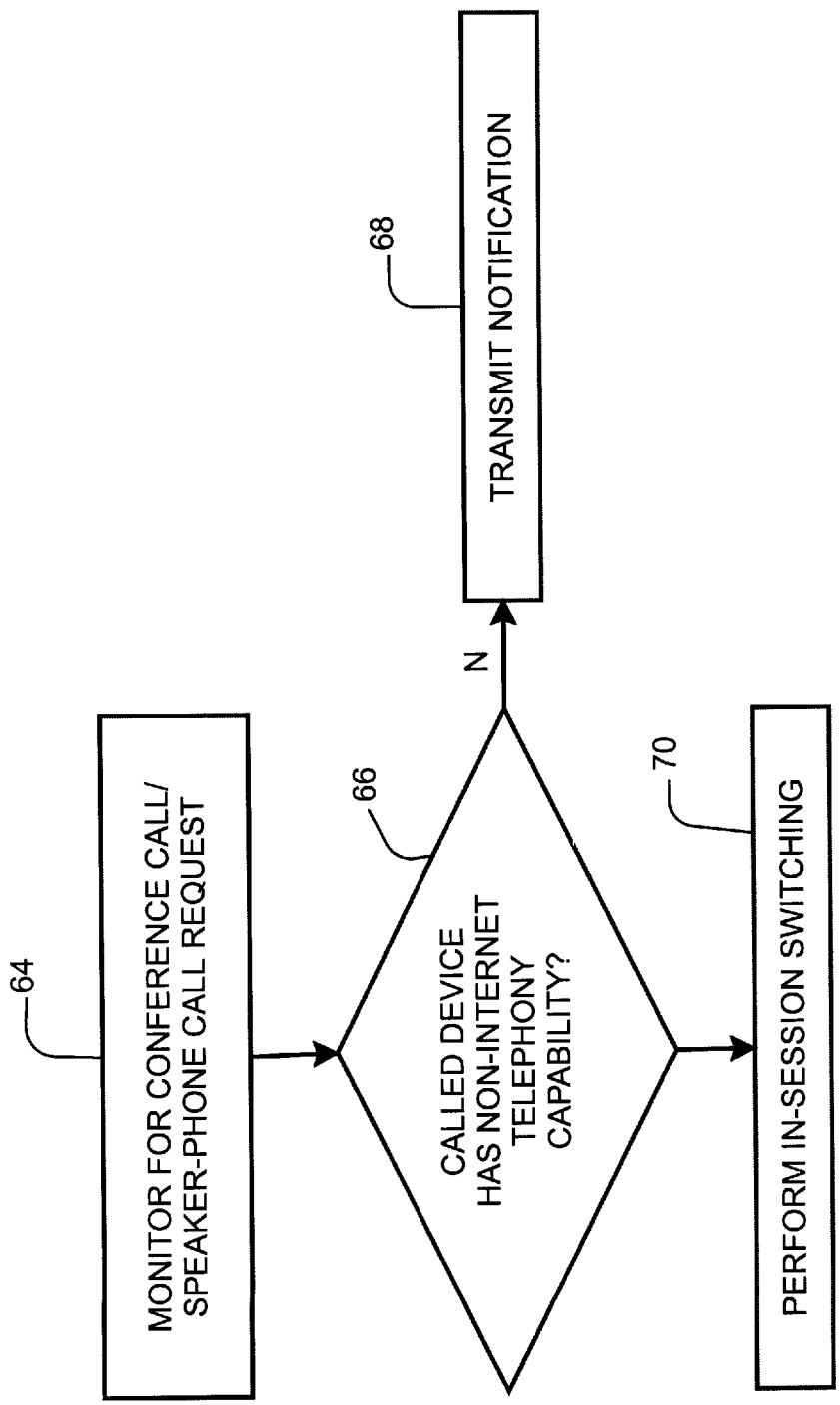
FIG. 4 is a process flow of a method for performing an in-session switch from an Internet telephony connection to a non-Internet telephony trunk connection performed by the enhanced telephony trunk router of FIG. 2.

In an alternative embodiment, an in-session trunk switch can be performed in step 58 in response to the attempt to activate the conference-call feature or the speaker-phone feature from first telephone 16 during an Internet telephony call. Referring to FIGS. 1, 2, and 4, the call requirements assessor 38 monitors the Internet telephony call for a request to establish a conference call or an activation of the speaker-phone feature in step 64. The call router 42 determines whether the second telephone 30 is capable of establishing a non-Internet telephony connection in step 66. If the second telephone 30 is incapable of such a connection, the notification is transmitted to the first telephone 16 in step 68 that the Internet telephony connection is incompatible with a conference call. If the second telephone is capable of establishing a non-Internet telephony connection, the call router 42 establishes a non-Internet telephony trunk connection via the first 20 and second 26 toll offices to the second central office 28. The Internet telephony trunk connection is torn down and the call to the second telephone 30 is switched in step 70 to the non-Internet telephony trunk connection. If a conference call was requested, the conference call is established after the call is switched from the Internet telephony trunk connection to the non-Internet telephony trunk connection.

What is claimed is:

1. A method for selectively routing outgoing calls over one of a plurality of outbound lines including a voice-over-data-network line comprising the steps of:
   evaluating quality of service (QoS) requirements of an outgoing call;
   selecting an outbound line over which to route said outgoing call from a set of outbound lines which include said voice-over-data-network line if it is determined that said voice-over-data-network line provides a level of QoS which satisfies said QoS requirements; and
   automatically routing said outgoing call over a non-voice-over-data-network line if it is determined that said voice-over-data-network line does not provide a QoS level which satisfies said QoS requirements.

2. The method of claim 1 wherein said evaluating step includes determining whether said outgoing call is one of a speaker-phone call and a conference call, said routing step including automatically routing said outgoing call over said non-voice-over-data-network line if it is determined that said outgoing call is said one of said speaker-phone call and said conference call.

3. The method of claim 2 wherein said evaluating step includes monitoring an outgoing call request for a protocol element representative of one of a speaker-phone call request and a conference call request.

4. The method of claim 1 further comprising the step of providing notification to a communication device from which said outgoing call originated that a selected voice-over-data-network line is incompatible with activation of one of a speaker-phone feature and a conference-call feature in said communication device.

5. The method of claim 4 further comprising the step of preventing an activation of one of said speaker-phone feature and said conference-call feature in response to an attempted activation of one of said speaker-phone feature and said conference-call feature.

6. The method of claim 1 wherein said step of evaluating QoS requirements includes determining a class of service associated with said outgoing call.

7. The method of claim 1 wherein said selecting step is a step of selecting said outbound line from said set of outbound lines which includes an Internet telephony trunk.

8. An apparatus for enhanced telephony trunk routing comprising:
   means for recognizing minimum requirements associated with a call request;
   means, responsive to said recognizing means, for comparing said minimum requirements to QoS capabilities of a voice-over-data-network line; and
   means, in communication with said comparing means, for routing an outbound call over a non-voice-over-data-network line in response to said call request based upon a determination that said QoS capabilities of said voice-over-data-network line are insufficient to satisfy said minimum requirements.

9. The apparatus of claim 8 wherein said recognizing means is configured to recognize said minimum requirements associated with one of a speaker-phone call and a conference call.

10. The apparatus of claim 9 further comprising means for alerting a communication device from which said call request originated that a selected voice-over-data-network line has insufficient QoS capability to support one of a speaker-phone feature and a conference-call feature associated with said communication device.

11. The apparatus of claim 10 wherein said alerting means is configured to prevent an activation of one of said speaker-phone feature and said conference-call feature in said communication device in response to an attempted activation of one of said features.

12. The apparatus of claim 9 further comprising means for switching from said voice-over-data-network line to said non-voice-over-data-network line during an Internet telephony call in response to one of an attempted activation of a speaker-phone feature and an attempted activation of a conference-call feature in a communication device from which said outbound call originated.

13. The apparatus of claim 9 wherein said means for recognizing said minimum requirements is enabled to recognize multiple classes of service associated with outgoing calls, said routing means being configured to route an outbound call associated with a first class of service over said non-voice-over-data-network line irrespective of minimum requirements associated with said call associated with said first class of service.

14. The apparatus of claim 9 wherein said apparatus is included in one of a private branch exchange (PBX) and a public switch telephone network central office.

15. A method for enhanced selective routing of outbound telephone calls over a plurality of telephony trunks including at least one Internet telephony trunk comprising the steps of:
   receiving a call request to establish an outbound telephone call;
   determining whether said call request includes one of a conference call request and a speaker-phone call request;
   routing said outbound telephone call over a non-Internet-telephony trunk in response to a determination that said call request includes said one of said conference call request and said speaker-phone call request;
   routing said outbound telephone call over said Internet telephony trunk in response to a determination that said call request does not include said one of said conference call request and said speaker-phone call request;
   monitoring said outbound call for a request to establish a conference call;
   determining whether a called communication device in said outbound call is capable of receiving a non-Internet telephony call; and
   performing an in-session switch from said Internet telephony trunk to said non-Internet telephony trunk in response to said request to establish said conference call if it is determined that said called communication device is capable of receiving said non-Internet telephony call.

* * * * *